US005662875A

United States Patent [19]
Bachelard et al.

[11] Patent Number: 5,662,875
[45] Date of Patent: Sep. 2, 1997

[54] CONTINUOUS PROCESS FOR THE PREPARATION OF SILICON NITRIDE BY CARBONITRIDING AND SILICON NITRIDE THEREBY OBTAINED

[75] Inventors: Roland Bachelard; Jean-Pierre Disson, both of Lyons; Bruno Morlhon, Villeubanne, all of France

[73] Assignee: Elf Atochem S. A., Paris, France

[21] Appl. No.: 646,599

[22] Filed: May 8, 1996

Related U.S. Application Data

[62] Division of Ser. No. 273,070, Aug. 23, 1994, abandoned, which is a continuation of Ser. No. 16,393, Feb. 11, 1993, abandoned.

[30] Foreign Application Priority Data

Feb. 18, 1992 [FR] France ................... 92 01806

[51] Int. Cl.$^6$ ................. C01B 21/068
[52] U.S. Cl. ................. 423/344
[58] Field of Search ................. 423/344

[56] References Cited

FOREIGN PATENT DOCUMENTS

| | | | |
|---|---|---|---|
| 082343 | 6/1983 | European Pat. Off. | 423/344 |
| 131894 | 10/1984 | European Pat. Off. | 423/344 |
| 60-251108 | 12/1985 | Japan | 423/344 |
| 63-239104 | 5/1988 | Japan | 423/344 |
| 63-297205 | 12/1988 | Japan | 423/344 |

*Primary Examiner*—Wayne A. Langel
*Attorney, Agent, or Firm*—Pennie & Edmonds LLP

[57] ABSTRACT

The present invention relates to a new process for the manufacture of fine powder of silicon nitride, to this powder and to the sinters obtained from the latter. The process comprises the reaction, in a nitrogen countercurrent and in continuous fashion, of silica, carbon and a seed crystal, in the presence of a volatile compound of a metal chosen from the group consisting of Be, Mg, Ca, Sr, Ge, Sn, Ti, Hf, Na and Ba, in a reaction zone possessing a temperature gradient, comprising a hot zone in which the said metal compound passes into the gaseous state and a cold zone in which the said metal compound in the gaseous state condenses, the said metal compound in the gaseous state being carried from the hot zone to the cold zone by the nitrogen countercurrent.

19 Claims, No Drawings

CONTINUOUS PROCESS FOR THE PREPARATION OF SILICON NITRIDE BY CARBONITRIDING AND SILICON NITRIDE THEREBY OBTAINED

This is a division of application Ser. No. 08/273,070, filed Aug. 23, 1994, abandoned, which is a continuation of application Ser. No. 08/016,393, filed Feb. 11, 1993, abandoned.

TECHNICAL FIELD

The present invention relates to a continuous process for the preparation of silicon nitride by carbonitriding, and relates to the silicon nitride thereby obtained.

BACKGROUND ART

Silicon nitride belongs to the family of technical ceramics. The special properties of silicon nitride make it an especially suitable material for the manufacture of articles intended for use at high temperatures, typically from 1000° to 1200° C. The articles manufactured from silicon nitride are obtained by high-temperature sintering, under a nitrogen atmosphere, of a powder of silicon nitride in $\alpha$ form, to which an additive that promotes densification is traditionally added. The mechanical properties of articles produced from silicon nitride are mechanical strength, resistance to thermal shock, hardness and high wear resistance, and these articles are hence widely used in every type of industry. As examples, silicon nitride is used for the production of automobile rocker arms, turbocompressor rotors, precombustion chambers for diesel engines in the automobile industry, ballbearings, nozzles, extrusion dies and cutting tools.

The known processes for the synthesis of silicon nitride on an industrial scale are as follows:

i) Direct nitriding of silicon:

$$3 \text{ Si} + 2 \text{ N}_2 \rightarrow \text{Si}_3\text{N}_4$$

This reaction is highly exothermic and difficult to control, and yields coarse powders which hence have to be ground before sintering is carried out.

ii) Thermal decomposition of a silicon imide, for example according to the equations:

$$3 \text{ Si(NH)}_2 \rightarrow \text{Si}_3\text{N}_4 + 2 \text{ NH}_3$$

$$3 \text{ Si(NH}_2)_4 \rightarrow \text{Si}_3\text{N}_4 + 8 \text{ NH}_3$$

This reaction yields a powder which is very fine but nevertheless amorphous, and which has to be crystallized at a temperature of 1300° to 1500° C.

iii) Carbonitriding of silica:

$$3 \text{ SiO}_2 + 6 \text{ C} + 2 \text{ N}_2 \rightarrow \text{Si}_3\text{N}_4 + 6 \text{ CO}$$

This process possesses the major advantage of employing inexpensive starting materials and of not yielding any effluent other than CO, which is readily burnt. Nevertheless, carbonitriding possesses drawbacks. The reaction temperature must be perfectly controlled. Above 1470° C., there are risks of formation of SiC. Below 1400° C., there are risks of formation of a poorly crystallized product containing a large amount of oxygen. During the process, there is competition between the formation of two crystalline forms of $\text{Si}_3\text{N}_4$, the $\alpha$ and $\beta$ forms. The $\alpha$ form is the desired form, since this is the one which yields sintered bodies possessing the above mentioned properties. Furthermore, the particle size of the powder is critical for the carrying out of sintering; a perfectly controlled particle size is hence necessary. Since the process is carried out under a stream of nitrogen, carry-over of materials often takes place. This carry-over is due to the formation of an intermediate, SiO gas, abbreviated to $\text{SiO}_{(g)}$, which can either disproportionate at a temperature of 1000° to 1200° C. to $\text{SiO}_2$ and Si, resulting in fouling of the plant, or lead to the formation of rod-shaped crystals of $\text{Si}_3\text{N}_{4(w)}$, termed "whiskers", which are unsuitable for sintering, probably according to the reaction:

$$3 \text{ SiO}_g + 3 \text{ CO}_g + 2 \text{ N}_2 \rightarrow \text{Si}_3\text{N}_{4w} + 3 \text{ CO}_2$$

In order to solve the above mentioned problems many processes have been proposed.

The addition of seed crystals, as described in Patents U.S. Pat. No. 4,428,916 and FR-A-2,388,763, has made it possible to favor the production of $\text{Si}_3\text{N}_4$ powders in $\alpha$ form and a controlled particle size. Control of the particle size is, however, only partially obtained, and the problems of formation of by-products, in particular of the gaseous kind, remain.

The addition of additives, as described in Patents GB-A 1,028,977 and EP-A 131,894, facilitates carrying out the carbonitriding process, in particular as regards formation of the $\alpha$ form of $\text{Si}_3\text{N}_4$ and particle size, as above, but also enables coarser-sized starting materials to be used. Furthermore, this addition of additive has a catalytic action on the formation of silicon nitride. Thus, EP-A-131,894 describes and claims a process for the manufacture of fine powder of $\alpha$-$\text{Si}_3\text{N}_4$ by carbonitriding a mixture, prepared by adding at least one of the following additives, namely (a) a mixture of at least one of the elements Be, Mg, Ca, Sr, Ge, Sn, Ti and Hf and compounds of these elements with 0.01 to 1 part by weight of silicon nitride powder, or (b) a mixture of Zr and compounds of the latter with 0 to 1 part by weight of silicon nitride powder, in a total quantity of 0.001 to 0.1 part by weight, calculated in terms of elemental weight(s) of Be, Mg, Ca, Sr, Ge, Sn, Ti, Hf and Zr, and 1 part or less by weight of silicon nitride powder, to 1 part by weight of silicon oxide powder and to 0.4–parts by weight of carbon powder.

Unfortunately, the problem of formation of by-products is not solved, and is even made worse, since gaseous compounds of the additives form and condense on the cold parts of the reactor, leading to silicon nitride powders whose final content of these additives is not controlled. The sintering of these products is hence made more difficult. Moreover, the technique described in EP-A-131,894 is a batch process (operating batchwise) which cannot be used in continuous fashion on account of the accumulation of the elements mentioned above.

SUMMARY OF THE INVENTION

The present inventors have found, surprisingly and unexpectedly, that the above problems are avoided by means of the present invention.

Thus, the subject of the present invention is a process for the manufacture of fine powder of silicon nitride, comprising the reaction, in a nitrogen countercurrent and in continuous fashion, of silica, carbon and a seed crystal, in the presence of a volatile compound of a metal chosen from the group consisting of Be, Mg, Ca, Sr, Ge, Sn, Ti, Hf, Na and Ba, in a reaction zone possessing a temperature gradient, comprising a hot zone in which the said metal compound passes into the gaseous state and a cold zone in which the said metal compound in the gaseous state condenses, the said metal compound in the gaseous state being carried from the hot zone to the cold zone by the nitrogen countercurrent. The term "nitrogen countercurrent" as used in the present description denotes a stream of nitrogen, as well as a stream containing the nitrogen needed for the carbonitriding reaction in a mixture with another gas which is inert under the reaction conditions. The term "silica" as used in the present description denotes silica itself, $SiO_2$, or a precursor of $SiO_2$. The precursors envisaged are, without implied limitation, alkoxide, alkyl or alkyl halide compounds of silicon, fluorosilicic acid, quartz and silicates of metals mentioned above. Mixtures of $SiO_2$ and precursors are also envisaged in the present invention. Particle size of the silica is not critical and any form is suitable. Preferably, the silica is in the form of $SiO_2$. The term "carbon" as used in the present description denotes any form of carbon, that is to say, without implied limitation, carbon black chosen from the wide variety of charcoals, such as vegetable charcoal, acetylene black, thermal blacks, lampblacks, graphite, coke, and the like. The term "carbon" also denotes a substance which is a precursor of carbon. Such a cokable substance can be, without implied limitation, a thermosetting binder such as a phenolic, in particular phenol-formaldehyde resin, an epoxy resin, polyamide, polyurea or polycarbonate. Mixtures of carbon black and/or precursor of carbon are also envisaged. Preferably, the carbon is in the form of carbon black. The term "volatile compound of the metal" as used in the present description denotes a compound of the metal which passes into the gaseous state at the temperature of the hot zone of the reaction zone. This expression also covers mixtures capable of generating a volatile compound, that is to say denotes compounds of the metal which are not in themselves volatile at the temperature of the hot zone of the reaction zone but which, on reaction with one or more other constituents of the mixture, liberate a volatile compound of the metal. As an illustration of such mixtures, mixtures of metal oxide, for example MgO, and carbon may be mentioned. Among volatile compounds, preference will be given to products that pass into a stable gaseous phase at between 1000° and 1500° C.

The term "volatile compound of a metal", inasmuch as it presents the characteristics stated above in the present description, hence denotes, without implied limitation, the oxides, hydroxides, carbonates, nitrates, halides, nitrides, silicates, metal/silicon alloys and molecular forms of the said metal.

The term "metal compound" covers the terms "volatile compound of a metal" and "mixture capable of generating a volatile compound", as well as the solid and gaseous forms of this compound or of the compound obtained with a mixture capable of generating a volatile compound. Preferably, the said metal is magnesium.

Advantageously, the said magnesium compound is the oxide MgO.

The term "seed crystal" as used in the present invention denotes nuclei capable of promoting crystal formation. Preferably, they are chosen from the group consisting of $Si_3N_4$ in $\alpha$ and $\beta$ form, SiC, $Si_2ON_2$, and the like. Advantageously, the seed crystal is $\alpha$-$Si_3N_4$.

The process which is the subject of the present invention employs transport in the gaseous phase. The reaction mixture in the cold zone of the reaction zone contains the metal compound in the solid state, deposited or mixed; when this reaction mixture advances in the reactor, the temperature increases and the reaction takes place; when the mixture finally reaches the hot zone, passage of the metal compound into the gaseous phase takes place, the compound being carried by the nitrogen countercurrent and then condensing in the cold zone. The reaction and the passage into the gaseous phase can be partially or totally concomitant. The present process leads, on the one hand to a "recycling" of the metal compound used as catalyst, and hence to a smaller consumption of this compound. And on the other hand the present process yields a silicon nitride powder whose content of metal compound is independent of the starting materials and which is constant, since accumulation of the metal compound as in the prior art does not take place. Furthermore, the present process affords great ease of control of the characteristics of the silicon nitride powder and of the operating conditions.

According to an embodiment of the present invention, the said reaction zone is fed with two charges, the first charge consisting of silica, carbon and seed crystal, the second charge containing at least the said volatile metal compound.

According to a variant of this embodiment, the said second charge consists of silica, carbon, seed crystal and the said volatile metal compound.

According to another variant, the said second charge consists of the said volatile metal compound, optionally mixed with carbon. The carbon is present for various purposes; as examples, it can react with the compound capable of generating a volatile compound, and/or it can serve as a binder.

In fact, these first and second charges may be introduced into the reactor in any order, insofar as the volatile compound is present in sufficient amount to provide for the reaction.

According to a mode of implementation of the present process, the said first and second charges are introduced simultaneously. The two charges are, in fact, fed via two different pipes, and mixed more or less in the reactor itself; the portion of volatile compound that escapes with the silicon nitride powder thus being replaced continuously.

According to another mode of implementation, the said first and second charges are introduced alternately. The two charges then form strata or layers in the reactor, the portion of volatile compound that escapes with the silicon nitride powder thus being replaced periodically.

The process according to the present invention may be initiated according to any standard procedure. However, a preferred initiation consists of a procedure wherein the reaction zone is fed initially with a charge containing silica, carbon, seed crystal and an excess of the said volatile compound. According to this initiation procedure, it is possible for the charges introduced into the reactor during the operation of the reactor not to be of strictly constant composition, but to be diverse. The excess volatile compound plays a catalyst-buffering role, which hence makes it possible to control the functioning of the reactor easily and to produce a silicon nitride powder of constant composition.

In the reaction zone, the said temperature gradient is a gradient from 1000° to 1500° C.

Advantageously, the said temperature gradient is followed by a substantially constant region at a temperature of between 1350° C. and 1500° C. In order to obtain the desired degree of conversion, the residence time in the reaction zone is from 0.5 to 20 h, and preferably 1 to 10 h.

The various constituents are introduced, in continuous operation, in quantities which can vary. The weights of the constituents are calculated as follows. Silica is expressed as $SiO_2$ equivalent, carbon as C equivalent and the metal as molecular equivalent.

Thus, silica and carbon are introduced into the reactor in continuous operation in quantities such that the silica/carbon mole ratio, expressed as $SiO_2/C$ is between 0.05 and 0.5, and preferably between 0.1 and 0.48; the seed crystal represents from 1 to 50% by weight, and preferably 5 to 20% of the silica.

The quantity of metal compound can vary within wide limits, inasmuch as, in continuous operation, it can be zero, and the maximum quantity is, in fact, fixed only by the consumption of this compound, that is to say its departure with the nitride powder extracted from the reactor.

The initial proportions of the constituents are those stated above, in relation to $SiO_2$ carbon and seed. As regards the initial quantity of metal compound, this can vary from approximately 0.1% by weight relative to $SiO_2$ to a maximum not exceeding, in molar terms, the quantity of carbon in the case of the introduction of two charges, the first consisting of silica, carbon and seed, the second consisting of silica, carbon, seed and metal compound. In the case where the second charge consists of the said metal compound, optionally mixed with carbon, the initial quantity can represent 100% of the charge (pure metal), or be such that the proportions are stoichiometric for the reaction between the metal compound and the other constituent yielding a volatile compound, for example carbon. During initiation by the introduction of a charge composed of silica, carbon, seed and metal compound, the latter preferably represents at least 0.5% of the weight of the silica.

The different constituents may be introduced into the reactor as a mixture that takes various forms, pulverulent, granulated, pelleted or extruded. Other ingredients may be added to this mixture, for example to facilitate its shaping. These ingredients can be water, an organic solvent, a binder, and the like. Preferably, the charge is in the form of extrudates.

The subject of the present invention is also the fine powder of silicon nitride obtained by the process according to the present invention. This silicon nitride powder possesses a specific area of less than 20 m²/g, is substantially spherical in shape, the particle size (diameter) is between 0.2 and 1 μM and this powder contains less than 2% by weight of impurities other than C and $O_2$.

The subject of the present invention is also the sinters obtained from the fine powder of silicon nitride according to the present invention.

DESCRIPTION OF PREFERRED EMBODIMENTS

The present invention is described in greater detail by the examples which follow, given by way of illustration and without implied limitation of the scope of the present invention, which is amenable to many variants that are readily accessible to a person skilled in the art.

EXAMPLES

Example 1

In a Z-shaped kneader, 60 g of fine silica (trade name Levilite, Rhône-Poulenc), 6 g of silicon nitride (trade name LC 12, Starck), 2.3 g of magnesium oxide (Prolabo), 30 g of acetylene black (trade name Y50A, SN2A), 50 g of phenol-formaldehyde resin (trade name R3593, CECA) and 50 g of demineralized water are mixed. The paste thereby obtained is extruded in a diameter of 4 mm and dried at 150° C.

In the same manner, extrudates identical to the above but not containing magnesium oxide are manufactured.

78 g of granules containing magnesium oxide (equivalent to a height of 17 cm) and then 141 g of granules not containing this compound (equivalent to a height of 32 cm) are introduced into a tube furnace equipped with an alumina tube of internal diameter 45 mm.

The tube furnace is equipped with a regulatory thermocouple. The alumina tube is supported by a cable connected to an electric motor via two pulleys. At its lower end, the tube is closed with a stopper, pierced to allow nitrogen to be admitted and a thermocouple, protected by an alumina sheath, to be inserted. At its upper end, the tube is closed with a stopper equipped with a bleed to allow nitrogen and carbon monoxide emanating from the reaction to leave. Inside the alumina tube, an assembly of graphite rings enables a crucible to be supported, the bottom of the latter being pierced to allow nitrogen to pass through. Above the crucible, the graphite rings contain the charge. The granules containing magnesium are placed in the space consisting of the crucible and the first rings placed on top. The granules free from magnesium are placed above.

Initially, the bottom of the crucible is placed above the center of the furnace, at a height such that, when the furnace is preheated to 1480° C., the granules placed on the bottom of the crucible are at a temperature below 1200° C.

When the preheated oven is at approximately 1480° C., the alumina tube and its contents are subjected to a downward movement by means of the motor, equivalent to 0.9 cm/h. Nitrogen is sent upwards at a flowrate of 18 l/h. The reactant gas and the granules hence travel in countercurrent fashion. After 53 hours of test, virtually all of the charge has passed through the hot zone of the furnace. No whisker, nor trace of product emanating from the transport of $SiO_{(g)}$ is visible. The analyses performed after removal of the excess carbon show that this result is due to the passage of a magnesium compound into the gaseous phase. Without wishing to be bound in any way, it is believed that the compound in question is probably $Mg_{(g)}$ or $Mg_3N_{2(g)}$. In effect, after removal of the excess carbon from the granules in air at 650° C., all the products have an identical composition. The granules which have been unable, at the time of stopping the test, to reach the zone of the furnace at more than 1450° C. contain more magnesium than the others, which demonstrates the existence of a mechanism of passage into the gaseous phase, transport towards the top of the furnace as a result of the countercurrent flow and condensation of a magnesium compound as a result of the thermal gradient.

The table below summarizes the characteristics of the final products obtained:

| Source product analyzed* | N(%) | O(%) | C(%) | Mg(%) | α/α + β | Other phases | BET area (m²/g) |
|---|---|---|---|---|---|---|---|
| Granules initially containing MgO ... | 41 | 1.15 | <0.2 | 0.4 | 0.99 | — | approx. 4 |
| Granules without MgO at the start which have reacted completely ... | 40 | 1.13 | <0.2 | 0.5 | 0.99 | — | approx. 4 |
| Granules without MgO at the start which have not reacted completely ... | 30 | 12 | 0.3 | 3.35 | | amorphous + MgSiN₂ approx. 5% | |

*after removal of the excess

X-ray microanalysis with a scanning electron microscope shows that the residual magnesium in the nitride is distributed uniformly.

The table below summarizes the characteristics of the final products obtained:

| Source product analyzed* | N(%) | O(%) | C(%) | Mg(%) | α/α + β | Other phases | BET area (m²/g) |
|---|---|---|---|---|---|---|---|
| Silica-based granules which have reacted completely ... | 39 | 1.3 | 0.5 | 0.6 | 0.99 | — | approx. 7 |
| Silica-based granules which have not reacted completely ... | 36 | 2.4 | 0.4 | 9.9 | | MgSiN₂ | |

*after removal of the excess carbon.

Example 2

In this example, the first part of the charge, instead of consisting of granules containing silica, magnesium oxide and carbon, consists of granules containing only magnesium oxide, carbon and a binder.

6 g of MgO (Prolabo), 48 g of acetylene black (Y50A, company SN2A), 22 g of phenol-formaldehyde resin (R3593, CECA) and 50 g of distilled water are introduced into a Z-shaped kneader. The mixture is extruded in a diameter of 4 mm and the extrudates are dried at 150° C.

Granules identical to those of Example 1 not containing magnesium oxide are also prepared.

36 g of magnesium oxide based granules (equivalent to 11 cm) and then 165 g of silica-based granules (equivalent to 38 cm) are introduced into the same experimental device as in Example 1.

The furnace is preheated to 1480° C., and the assembly of alumina tube and granules is imparted a downward movement at a speed of 0.9 cm/h. A stream of nitrogen of 24 l/h is sent in countercurrent fashion with respect to the movement of the granules. After 48 hours, all the granules initially containing magnesium oxide and the majority of those containing silica have passed through the hot zone of the furnace. No trace of silicon nitride whiskers or of products which may result from transport and decomposition of $SiO_{(g)}$ is found.

The analyses after removal of the excess carbon in air at 650° C. show that all the magnesium oxide initially present in the granules has disappeared. It is to be found in the form of magnesium compound in the silicon nitride and, in a larger proportion, in the granules which have not reacted completely when the test is stopped. This is evidence for the mechanism of evaporation/transport in the gaseous phase/condensation of Mg compounds. For the granules containing magnesium oxide which have reacted, the loss in air at 650° C. is 99.2%, hence substantially all the Mg has disappeared.

The scanning electron microscope shows that the nitride consists of virtually spherical elementary particles. As a result of its specific area of approximately 7 m²/g, this nitride is especially advantageous for injection moulding. In the present process, the quantity of Mg present in the furnace may be controlled by the proportion of the two types of granules introduced.

Example 3

This example also illustrates the operation in continuous fashion which forms the subject of the present invention.

Two mixtures of the following compositions are prepared:

mixture 1: 79.2 kg of silica, 31.4 kg of acetylene black, 9.1 kg of phenol-formaldehyde resin, 3.2 kg of magnesium oxide, 7.9 kg of Si₃N₄ and demineralized water;

mixture 2: 790 kg of silica, 314 kg of acetylene black, 91 kg of phenol-formaldehyde resin, 79 kg of Si₃N₄ and demineralized water.

The mixtures thus prepared are extruded in a diameter of 4.5 mm and the extrudates are dried at 150° C.

The reactor is a vertical graphite tube of length/diameter ratio 10. Initially, the tube is filled with inert granules (carbon+binder). This tube is heated halfway up to a temperature of between 1400° and 1500° C. A stream of nitrogen of 6 kg/h is sent through the bottom of the graphite tube and discharged through the top. At the beginning, the inert granules are drawn off through the bottom of the furnace and, at the same flowrate, the top of the furnace is fed with granules originating from the mixture 1 (presence of MgO). As a result of the countercurrent flow of the nitrogen and the granules, a thermal profile varying from approximately 400° C. at the top of the reactor to 1430° C. halfway up is established. The drawing off and the feeding are maintained uninterruptedly. After 9 hours during which 42 kg of granules derived from the mixture 1 are introduced steadily, feeding is continued using granules of the mixture 2. This feeding is continued for 140 hours at a flowrate of 1.65 kg/h of granules. At the bottom of the furnace, the granules are drawn off-at a flowrate corresponding, after removal of the excess carbon, to 0.6 kg/h of $Si_3N_4$.

After this period of continuous operation, no whisker, nor any trace of transport of $SiO_{(g)}$, is detected. The silicon nitride produced has a chemical composition independent of the presence or absence of magnesium oxide in the granules from which it originates. Its specific surface area (BET) is approximately 6 $m^2/g$, and the residual Mg content is 0.5%. The $\alpha$-$Si_3N_4$/($\alpha$-$Si_3N_4$+$\beta$-$Si_3N_4$) ratio is greater than 98.

We claim:

1. A process for the manufacture of fine powder of silicon nitride, comprising the reaction, in a nitrogen countercurrent and in continuous fashion, of silica, carbon and a seed crystal, in the presence of a volatile compound of a metal chosen from the group consisting of Be, Mg, Ca, Sr, Ge, Sn, Ti, Hf, Na and Ba, in a reaction zone possessing a temperature gradient comprising a hot zone in which the said metal compound passes into the gaseous state and a cold zone in which the said metal compound in the gaseous state condenses, the said metal compound in the gaseous state being carried from the hot zone to the cold zone by the nitrogen countercurrent.

2. A process according to claim 1, characterized in that the said reaction zone is fed with two charges, the first charge consisting of silica, carbon and seed crystal, the second charge containing at least the said volatile metal compound.

3. A process according to claim 2, characterized in that the said second charge consists of silica, carbon, seed crystal and the said volatile metal compound.

4. A process according to claim 2, characterized in that the said second charge consists of the said volatile metal compound, optionally mixed with carbon.

5. A process according to claim 2, 3 or 4, characterized in that the said first and second charges are introduced simultaneously.

6. A process according to claim 2, 3 or 4, characterized in that the said first and second charges are introduced alternately.

7. A process according to claim 1, 2, 3 or 4, characterized in that the reaction zone is fed initially with a charge containing silica, carbon, seed crystal and an excess of the said volatile metal compound.

8. A process according to claim 1, 2, 3 or 4, characterized in that the said temperature gradient is a gradient from 1000° to 1500° C.

9. A process according to claim 1, 2, 3 or 4, characterized in that the said temperature gradient is followed by a substantially constant region at a temperature of between 1350° C. and 1500° C.

10. A process according to claim 1, 2, 3 or 4, characterized in that the residence time in the reaction zone is from 0.5 to 20 h.

11. A process according to claim 1, 2, 3 or 4, characterized in that the said metal is magnesium.

12. A process according to claim 11, characterized in that the said magnesium compound is MgO.

13. A process according to claim 1, 2, 3 or 4, characterized in that the silica is in the form of $SiO_2$.

14. A process according to claim 1, 2, 3 or 4, characterized in that the carbon is in the form of carbon black.

15. A process according to claim 1, 2, 3 or 4, characterized in that the silica/carbon ratio, expressed as $SiO_2/C$, is between 0.05 and 0.5.

16. A process according to claim 1, 2, 3 or 4, characterized in that the seed crystal is chosen from the group consisting of $Si_3N_4$ in $\alpha$ and $\beta$ form, SiC and $Si_2ON_2$.

17. A process according to claim 16, characterized in that the seed crystal $\alpha$-$Si_3N_4$.

18. A process according to claim 1, characterized in that the seed crystal represents from 1 to 50% by weight of the silica.

19. A process according to claim 1, 2, 3 or 4, characterized in that the charge is in the form of extrudates.

* * * * *